United States Patent [19]

Frissell et al.

[11] 4,327,408

[45] Apr. 27, 1982

[54] CONTROLLER DEVICE WITH DIAGNOSTIC CAPABILITY FOR USE IN INTERFACING A CENTRAL PROCESSING UNIT WITH A PERIPHERAL STORAGE DEVICE

[75] Inventors: John M. Frissell, Dracut; Kris E. Swanson, Grafton, both of Mass.

[73] Assignee: Data General Corporation, Westboro, Mass.

[21] Appl. No.: 30,727

[22] Filed: Apr. 17, 1979

[51] Int. Cl.³ ............................................. G06F 3/00
[52] U.S. Cl. ...................................... 364/200; 371/3; 371/16
[58] Field of Search ... 364/200 MS File, 900 MS File; 371/15, 16, 18, 20, 21, 23

[56] References Cited

U.S. PATENT DOCUMENTS

| | | | |
|---|---|---|---|
| 3,753,236 | 8/1973 | Flynn et al. | 364/200 |
| 3,798,614 | 3/1974 | Meadows et al. | 364/200 |
| 3,932,843 | 1/1976 | Trelut et al. | 364/200 |
| 4,048,481 | 9/1977 | Bailey, Jr. et al. | 371/16 |
| 4,103,338 | 7/1978 | Cizmic et al. | 364/900 |
| 4,115,852 | 9/1978 | Rozell | 364/200 |
| 4,156,796 | 5/1979 | O'Neal et al. | 364/900 X |
| 4,177,515 | 12/1979 | Jenkins et al. | 364/200 |

OTHER PUBLICATIONS

Kulka, R. et al., "Diagnostic Procedures" in *IBM Technical Disclosure Bulletin*, vol. 14, No. 9, Feb. 1972, pp. 2749-2750.

*Primary Examiner*—Raulfe B. Zache
*Attorney, Agent, or Firm*—Irving M. Kriegsman; Joel Wall; Irving Rappaport

[57] ABSTRACT

A controller for interfacing a central processor unit (CPU) to a peripheral storage device which can be tested for proper operation independent of the peripheral storage device includes a sequencer, a buffer, a microprocessor and various error detection logic. A gate is coupled between the sequencer and the input of the peripheral storage device for enabling or disabling the transfer of data from the sequencer to the peripheral storage device and a multiplexer is coupled between the microprocessor, the output of the peripheral storage device and the sequencer for selecting inputs to the sequencer from either the microprocessor or the peripheral storage device. During a normal write operation, write signals are sent from the CPU to the sequencer through the buffer and then from the sequencer to the peripheral storage device through the gate. During a normal read operation, read signals are sent from the peripheral storage device to the sequencer through the multiplexer and then from the sequencer to the CPU through the buffer. During a test write operation, the input to the peripheral storage device is disabled and write signals that would normally be sent from the sequencer to the peripheral storage device are sent to the microprocessor and then from the microprocessor to the CPU. During a test read operation, simulated read signals are generated in the microprocessor, sent from the microprocessor to the sequencer through the multiplexer and then sent from the sequencer to the CPU through the buffer.

17 Claims, 4 Drawing Figures

CONTROLLER DEVICE WITH DIAGNOSTIC CAPABILITY FOR USE IN INTERFACING A CENTRAL PROCESSING UNIT WITH A PERIPHERAL STORAGE DEVICE

BACKGROUND OF THE INVENTION

The present invention relates to data transfer apparatus for use in data processing systems and, more particularly, to a controller for interfacing a central processor unit (CPU) to a peripheral storage device which can be tested for reliability independent of the peripheral storage device.

Data processing systems comprising a CPU, a peripheral storage device, such as a disk system, and a controller for interfacing the CPU to the peripheral storage device are well known in the art. The controllers employed in these systems usually include a sequencer for controlling the flow of data to and from the peripheral storage device, a buffer for providing temporary storage of data being transferred to and from the CPU and a microprocessor for controlling the operations of the sequencer, the buffer and other logic, such as error detection circuits.

During a write operation, data is transferred from the CPU to the sequencer through the buffer and then from the sequencer to the peripheral storage device. During a read operation, data is transferred from the peripheral storage device to the sequencer and then from the sequencer to the CPU through the buffer.

In the past, the operation of such data processing systems has been tested in two stages. First the CPU is tested apart from the remainder of the system to insure that it is functioning properly. Then, the controller and peripheral storage device are tested as a subsystem to determine if those two units in combination are functioning properly. In both stages, the testing is accomplished through the use of diagnostic programs. In testing the operation of the controller and peripheral storage device as a subsystem, special test words are sent from the CPU through the controller to the peripheral storage device and then sent back from the peripheral storage device to the CPU through the controller. A comparison is then made of the words sent and the words retrieved. If they are identical it is assumed that the subsystem is functioning properly. If they are not identical a malfunction is present somewhere in the subsystem.

Although this technique for testing the overall system has proven to be generally satisfactory for detecting malfunctions in the CPU, it has not proven to be totally adequate or acceptable for testing the operation of the remainder of the system.

One of the shortcomings with the technique is that it only reveals if the controller and peripheral storage device as a subsystem are functioning properly. If a malfunction is indicated, it does not reveal whether the malfunction is in the controller or in the peripheral storage device. Another shortcoming with the technique is that it does not test the operation of the controller in a complete manner. The test only makes a comparison of a word read back to the CPU with a word written into the peripheral storage device. The technique does not involve forcing or creating improper operations in the subsystem and consequently is not conclusive as to whether the error detection logic and other circuits and parts in the controller or peripheral storage device are functioning properly.

Accordingly, the need exists for a controller for interfacing a CPU with a peripheral storage device which can be tested for proper operation apart from the peripheral storage device and which can be tested in a more complete manner than in the prior art.

BRIEF SUMMARY OF THE INVENTION

In accordance with the features of this invention there is provided a controller for interfacing a CPU with a peripheral storage device which overcomes the aformentioned shortcomings of the prior art.

The controller includes a sequencer for controlling the operation of the peripheral storage device, a buffer for providing temporary storage of data, a microprocessor for controlling the sequencer and the buffer and various error detection logic. Gating means are included for selectively enabling or disabling the output signals from the sequencer to the peripheral storage device and multiplexer means are provided for transferring inputs to the sequencer from either the microprocessor or the peripheral storage device. Means are further included for transferring data from the sequencer to the microprocessor.

During a normal operation, data to be written into the peripheral storage device is transferred from the CPU to the sequencer through the buffer and then from the sequencer to the peripheral storage device. Data to be read from the peripheral storage device is sent from the peripheral storage device to the sequencer through the multiplexer means and then from the sequencer to the CPU through the buffer.

During a test operation command signals are provided to the microprocessor from the CPU for disabling the transfer of data from the sequencer to the peripheral storage device and enabling the transfer of data from the microprocessor to the sequencer through the multiplexer means. Test of data transfer from the CPU through the controller to the peripheral storage device is achieved by sending test write signals from the sequencer that would normally be sent to the peripheral storage device back to the CPU through the microprocessor. Test of data transfer from the peripheral storage device through the controller to the CPU is achieved by generating simulated read signals in the microprocessor and then sending those signals to the sequencer through the multiplexer and then from the sequencer to the CPU through the buffer.

Since the peripheral storage device is disabled from the controller during the test operations any malfunctions detected are malfunctions within the controller. In addition, by using simulated read signals rather than actual read signals it is possible to perform tests that could not otherwise be performed on the controller, such as tests to determine the proper operation of the error detection logic.

The operation of the entire data processing system is tested in the following manner. First, the CPU is tested independent of the controller and peripheral storage device as in the prior art. Any malfunctions detected are corrected. Then, the controller is tested as described above. Any malfunctions detected in the controller are similarly corrected. Finally, the controller and peripheral storage device are tested as a subsystem as in the prior art. Any malfunctions detected during this last test are, by elimination, malfunctions in the peripheral storage device.

BRIEF DESCRIPTION OF THE DRAWINGS

Further features and advantages of the invention will become more readily apparent from the following detailed description of a specific embodiment of the invention when taken in conjuction with the accompanying drawings. In the several figures like reference numerals represent like parts.

DETAILED DESCRIPTION OF PREFERRED EMBODIMENTS

The present invention relates to a controller for interfacing a CPU to a peripheral storage device which has the capability of being electrically disabled from the peripheral storage device and then thoroughly and efficiently tested for reliable and proper operation. The technique for testing the controller involves routing signals that would normally be sent to the peripheral storage device back to the CPU and generating signals simulating signals that would normally be received by the controller from the peripheral storage device.

The invention will hereinafter be described in connection with a disk drive peripheral storage device having certain input and output signals. It is to be understood, however, that the invention is not intended to be limited to disk drive type peripheral storage devices and is not intended to be limited to peripheral storage devices having any specific input and output signals.

Figure 1:
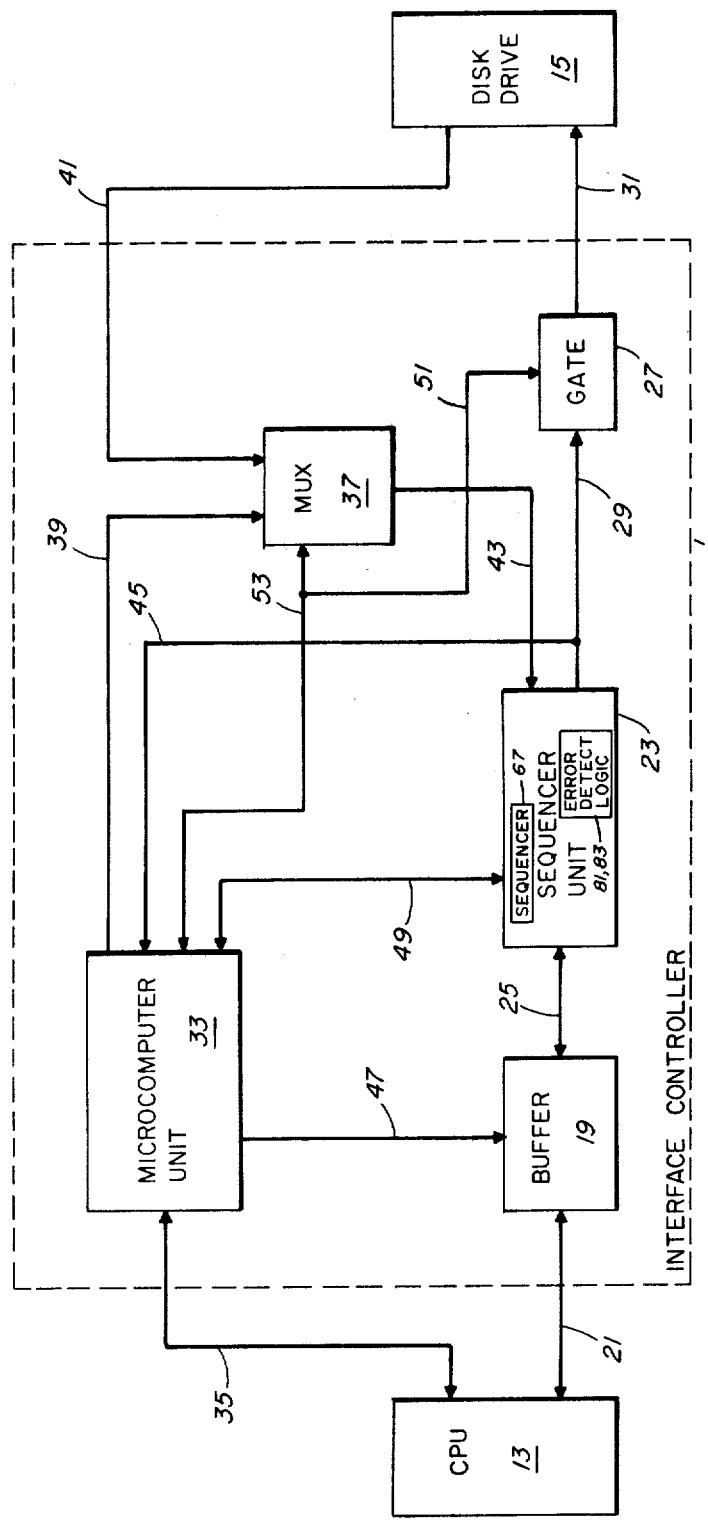
FIG. 1 is a block diagram of a data processing system incorporating a controller constructed in accordance with the invention.

Referring now to the drawings, there is illustrated in FIG. 1 a data processing system identified generally by reference numeral 11.

Data processing system 11 includes a CPU 13 and a disk drive 15. CPU 13 is of any known type such as the type made and sold by Data General Corporation, Westboro, Mass., under the model designation micro NOVA Data Processing system.

Disk drive 15 is of the type which receives input signals including write gate, write data and read gate signals during a write operation and sends out signals including disk color, sector pulse and read data signals during a read operation. Disk drive 15 contains at least one disk on which information can be stored and retrieved and a disk drive mechanism for effecting the reading and writing of such information. An example of such a device is the disk drive made and sold by Data General Corporation, Westboro, Mass., under the model designation 6101 Disk Subsystem. Disk drive 15 is interfaced to CPU 13 through a controller 17.

CONSTRUCTION OF CONTROLLER

Controller 17 includes a data transfer buffer storage element 19 which provides for the storage of words transferred to or from disk drive 15 during a write or read operation, respectively. Buffer 19 is interfaced with CPU 13 by a bus 21. Buffer 19 is also interfaced with a sequencer unit 23 by a bus 25.

Sequencer unit 23 includes a sequencer for controlling the transfer of data between CPU 13 and disk drive 15. Sequencer unit 23 also includes logic for serialization and deserialization of data to and from disk drive 15 and logic for detecting errors in the operation of controller 17 and disk drive 15.

A gating unit 27 which may be in the form of an AND gate is in communication with sequencer unit 23 by control bus 29 and with disk drive 15 by a control bus 31. Gating unit 27 serves as a means for selectively enabling or disabling the transfer of data from sequencer unit 23 to disk drive 15.

A microcomputer unit 33 is provided for controlling the overall operation of controller 17. Microcomputer unit 33 includes a microprocessor for carrying out the commands of CPU 13. Microcomputer unit 33 also includes logic for interfacing the microprocessor with CPU 13. Microcomputer unit 33 is connected to CPU 13 by a bus 35 and to one input of a two-to-one bus multiplexer 37 by a bus 39. The other input of multiplexer 37 is connected to the output of disk drive 15 by a bus 41. The output of multiplexer 37 is connected to sequencer unit 23 by a bus 43. Microcomputer unit 33 is also connected to bus 29 by a bus 45. Microcomputer unit 33 is in communication with buffer 19, sequencer unit 23, gating unit 27 and multiplexer 37 through lines 47, 49, 51 and 53, respectively.

The specific design of the microprocessor and logic circuits in microcomputer unit 33 and the specific design of the sequencer and logic circuits in sequencer unit 23 are not considered to be part of this invention.

Figure 2:
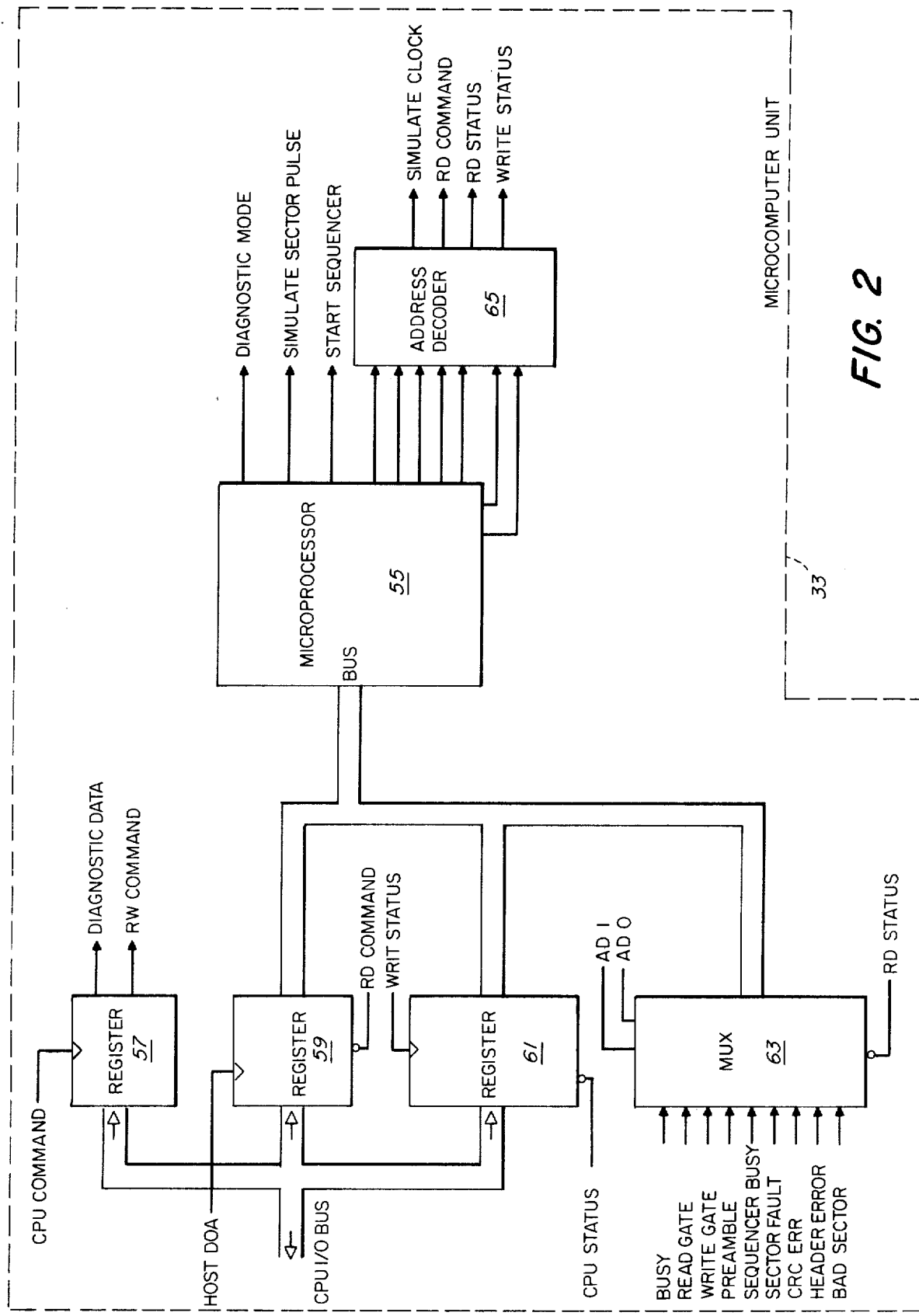
FIG. 2 is a block diagram of the microcomputer unit shown in the controller in FIG. 1.

However, as illustrated in FIG. 2, microcomputer unit 33 may comprise a microprocessor 55, three registers 57, 59, and 61, a multiplexer 63 and an address decoder 65. Micro-processor 55 may be of the type manufactured by Intel Corporation under the designation 8048. Register 57 which serves the function of latching commands from CPU 13 to various logic in controller 17 may be an Octal D type register having the industry designation 74LS273. Registers 59 and 61 which serve to latch commands between CPU 13 and the microprocessor 55 may be TRI STATE Octal type registers having the industry designation 74LS374. Multiplexer 63 which allows various pieces of information to be accessed by microprocessor 55 may be of the type having the industry designation 74LS253. Address decoder 65 may be of the type manufactured by Texas Instrument Corporation under the designation 74139.

Figure 3:
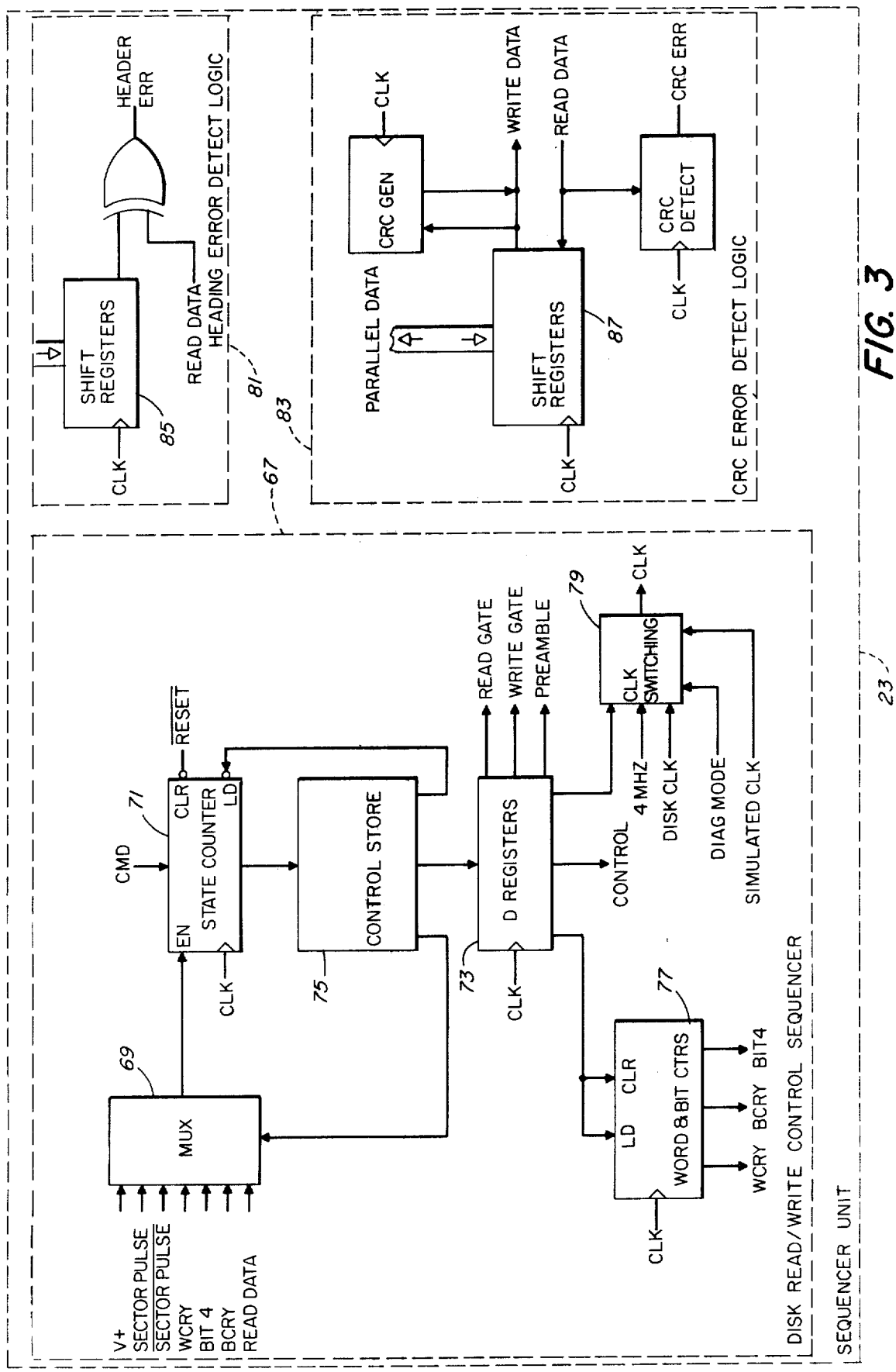
FIG. 3 is a block diagram of the sequencer unit shown in the controller in FIG. 1.

Sequencer unit 23 may comprise, as illustrated in FIG. 3 a disk read/write control sequencer 67 having an eight to one multiplexer 69, a counter 71, a plurality of register 73, a group of six read only memories 75, a group of three counters 77 and a clock switching device 79. Multiplexer 69 may be of the type known in the industry under the designation 743251. Counter 71 and a plurality of registers 73 may be of the type known in the industry under the designations 74LS161 and 74LS174, respectively. Read only memories 75 may be of the type known in the industry under the designation 82S129 and the counters 77 may be of the type known in the industry under the designation 74LS163. Sequencer unit 23 further includes logic 81 for detecting header errors and logic 83 for detecting CRC (cyclic redundency check) errors and performing data serialization and deserialization of data. The logic 81 for detecting header errors includes two shift registers 85 of the type known in the industry under the designation 74165. The logic 83 for performing data serialization and deserialization and detecting CRC errors includes respectively, two shift registers 87 of the type known in the industry under the designation 74LS299 and an integrated circuit chip known in the industry under the Fairchild designation 9401.

OPERATION OF CONTROLLER

During a normal write operation, data is transferred from CPU 13 to buffer 19 through bus 25 and then from buffer 19 to sequencer unit 23. The data is then transferred by sequencer unit 23 to disk drive 15 through bus 29, gating unit 27 and bus 31.

During a normal read operation, data signals are transferred from disk drive 15 to multiplexer 37 through bus 41 and then from multiplexer 37 to sequencer unit 23 through bus 43. The data is then transferred through bus 25 to buffer 19 and thereafter from buffer 19 to CPU 13 through bus 21.

The timing of the read and write operations is controlled by sequencer 67. Time intervals are measured in sequencer 67 by counting the clock cycles of a clock in disk drive 15, each clock cycle corresponding to a fixed unit of time, such as one microsecond.

Controller 17 is placed in a test mode by sending an appropriate diagnostic command signal from CPU 13 to microcomputer unit 33. Microcomputer unit 33 then sends out signals disabling gating unit 27 to prevent the transfer of signals to disk drive 15 and enabling multiplexer 37 input from microcomputer unit 33 so that signals can be transferred from microcomputer unit 33 to sequencer unit 23.

Test of data transfer from CPU 13 through controller 17 to disk drive 15 is then achieved by sending test write signals, including write data, write gate and read gate signals, to sequencer unit 23 through buffer 19. These signals are then sent from sequencer unit 23 through bus 45 to microcomputer unit 33 and thereafter from microcomputer unit 33 back to CPU 13. Since gating unit 27 is in a disabled state signals from sequencer unit 23 are not transferred to disk drive 15. Thus, the possibility of destroying information already stored in disk drive 15 is avoided.

Test of data transfer from disk drive 15 through controller 17 to CPU 13 is achieved by utilizing microprocessor 55 in microcomputer unit 33 to generate signals simulating read signals that would normally be sent to controller 17 from disk drive 15. These signals include disk clock, sector pulse and read data signals. The simulated signals are transferred from microcomputer unit 33 to multiplexer 37 through bus 39, then from multiplexer 37 to sequencer unit 23 through bus 43 and thereafter from sequencer unit 23 to CPU 13 through bus 25, buffer 19 and bus 21. Since these signals are created in the microprocessor, their values can be adjusted at any time, as desired, to force errors to determine if the error detection logic in controller 17 is functioning properly. These errors include, but are not limited, to sector fault errors, address header errors and read data errors.

For example, a sector fault error is a type of error in a disk drive system which occurs if read or write data erroneously overflows into the next sector. Since this invention involves simulating read signals, by simulating an end of sector pulse signal before the end of the sector, the operation of the sector error detection logic can be easily tested. A read data error is a type of error which occurs if a word is read improperly. Since this invention involves simulating read signals, a read data error can be forced to determine if the error logic associated with read errors is functioning properly. Using prior art techniques, these errors could not be intentionally created. Consequently, the operation of these error detection logic circuits could not positively be tested.

Figure 4:
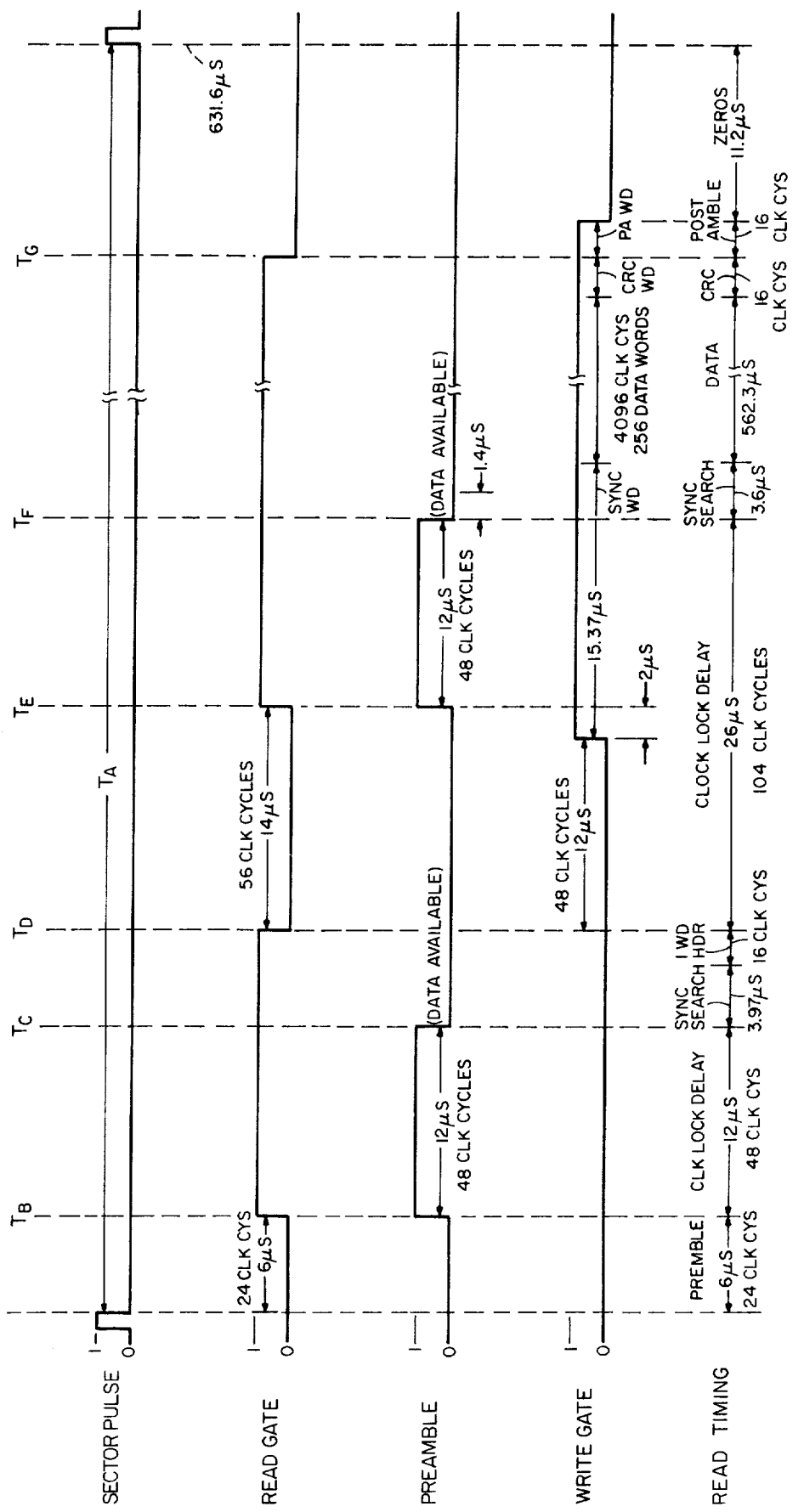
FIG. 4 is a timing diagram illustrating the operation of the disk drive shown in FIG. 1.

The testing procedure may be better understood with reference to FIG. 4 where there is illustrated a timing chart for disk drive 15. The particular numerical values for the various time intervals indicated and the particular sequence are for illustrative purposes only and will, or course, vary depending on the specific disk drive.

As can be seen, the time period $T_A$ between a sector pulse trailing edge and the next sector pulse leading edge is six hundred and thirty-one and six-tenths microseconds.

During a read operation, if the system is functioning properly, six microseconds after the sector pulse trailing edge, at time $T_B$, read gate and preamble will both change from zero to one. Twelve microseconds from that time, at time $T_C$, preamble will change to zero while read gate remains at one. A certain time thereafter, at time $T_D$, depending on variables such as the speed of the disk, read gate will change to zero. Fourteen microseconds thereafter, at time $T_E$, read gate and preamble will both change to one. Twelve microseconds after that, at time $T_F$, preamble will change to zero and a period of time after that when the operation is complete, time $T_G$, read gate will change to zero.

As noted before, the entire timing operation of the disk drive system is controlled by sequencer 67 and time periods are measured in sequencer 67 by counting the clock cycles of a clock in the disk drive. The ratio of clock cycles to time will vary according to the design of the disk drive. Thus, the disk drive may be designed as illustrated in the timing chart such that four clock cycles occur in an hence are equal to one microsecond. Microprocessor 55 makes use of this technique of counting clock cycles to measure time to simulate the various time intervals. Thus, a time period of two microseconds which corresponds to eight clock cycles can be simulated by sending out eight pulses.

Accordingly, during a test read operation microprocessor 55 will first send out a single pulse simulating a sector pulse. Microprocessor 55 will then send out twenty-four pulses simulating twenty-four clock cycles. After each pulse the status of the read gate may be checked. If the read gate changes to one before twenty-four clock cycles or does not change to one at exactly twenty-four clock cycles there is a malfunction in the read gate. Using the same technique, the timings for the other changes in the read gate can be checked. In addition, by simulating a sector pulse before the end of the sector, the proper operation of the sector error detection logic can be observed. Preamble timings can be tested in a similar manner, that is, by seeing if preamble changes from zero to one and one to zero at the proper clock cycles.

A variety of other tests can also be performed.

For example, seventy-two clock cycles after the start of sector pulse, at time $T_E$, serial data which would normally be received from disk drive 15 in a read operation is instead simulated by microprocessor 55 and sent to sequencer 67 along with each simulated clock pulse. Then, thirty-two pulses along with serial data simulating the synchronization word and the header word are sent out by microprocessor 55 to sequencer 67. Sequencer 67 will then detect the synchronization word and deserialize the header word into shift register 85 in the header error detection logic 81. CPU 13 can then make a comparison of the header word actually transferred to shift register 85 with the header word that is expected in shift register 85. By forcing an error in the header word, header error detection logic 81 can thus be checked.

After header error detection logic 81 is checked, sequencer 67 will then drop the read gate to zero, at time $T_D$, and fifty-six clock pulses thereafter, at time $T_E$, change read gate and preamble to one. Forty-eight clock pulses thereafter, at time $T_F$, preamble will change to zero. At this point in time sequencer 67 would then normally look for the synchronization word followed by a data block of two hundred and fifty-six words and a word check character. This information is, instead, provided serially through microprocessor 55 with each clock pulse, with sixteen clock pulses for each word. The data words are then deserialized in sequencer unit 23 and sent to CPU 13 through buffer 19. During the data word deserialization the CRC is accumulated in CRC logic circuitry 83 and compared with the CRC provided serially by the CPU 13. By forcing CRC errors, CRC error detection logic 83 is thus checked.

After the read operation is complete the data words transferred to CPU 13 may be compared with what was sent to controller 17 through CPU 13 as diagnostic data.

A test write operation may be accomplished in a similar fashion. In this case after the header and write gate timing are checked, serialized data that would normally be sent to disk drive 15 is compared with the words that were sent from CPU 13 to buffer 19.

Using the controller of this invention and the technique of generating signals in the microprocessor simulating certain key signals that would normally be sent to the controller from the peripheral storage device it is possible to test the performance of the controller during read and write operations in a complete and thorough manner.

The various features and advantages of the invention are thought to be clear from the foregoing description. Various other features and advantages not specifically enumerated will undoubtedly occur to those versed in the art, as likewise will many variations and modifications of the preferrred embodiment illustrated, all of which may be achieved without departing from the spirit and scope of the invention as defined by the following claims.

What is claimed is:

1. In a controller for interfacing a central processor unit to a peripheral storage device, said controller including a sequencer coupled between said central processor unit and said peripheral storage device for controlling the transfer of data between said central processor unit and said peripheral storage device and further including a microprocessor coupled to said central processor unit and said sequencer for controlling said sequencer on commands from the central processor unit, said sequencer including error detecting logic, the improvement comprising circuitry for enabling said controller to be tested for proper operation independent of said peripheral storage device, said circuitry including:
    a. gating means coupled in the data path between said sequencer and said peripheral storage device and connected to said microprocessor for enabling or disabling the transfer of data to said peripheral storage device from said sequencer in response to commands from the central processor unit so as to place the controller either in a diagnostic mode or a normal operating mode,
    b. means coupled to said microprocessor, said peripheral storage device and said sequencer for selecting output data from either said microprocessor or said peripheral storage device and transferring said output data to said sequencer on commands from the central processor unit for processing, and
    c. means coupled between said microprocessor and said sequencer for transferring data from said sequencer to said microprocessor on commands from the central processor unit when said controller is in a diagnostic mode, said data representing control signals generated during normal operation of said sequencer, said microprocessor transferring said data to said central processor unit on command signals from said central processor unit for comparison with expected data,
    d. whereby, said peripheral storage device may be electrically disconnected from said sequencer and test signals sent to said sequencer from said microprocessor and to said microprocessor from said sequencer, allowing thereby said error detecting logic in said sequencer to be tested for proper operation.

2. The improvement in accordance with claim 1 and wherein said means for enabling or disabling the transfer of data to said peripheral storage device comprises a gating unit coupled between said sequencer and said peripheral storage device.

3. The improvement in accordance with claim 2 and wherein said gating unit comprises an AND gate.

4. The improvement in accordance with claim 2 and wherein said means for selecting output data from either said microprocessor or said peripheral storage device and transferring such data to said sequencer comprises a multiplexer having an input port connected to said microprocessor, an input port connected to said peripheral storage device and an output port connected to said sequencer.

5. The improvement in accordance with claim 4 and wherein said means for transferring data from said sequencer to said microprocessor comprises a data bus.

6. The improvement of claim 5 and wherein said controller further includes a buffer connected between said central processor unit and said sequencer and coupled to said microprocessor for providing temporary storage of data transferred to and from said central processor unit that would either be stored on or read from said peripheral storage device.

7. A method of testing the operation of a controller, said controller interfacing a central processor unit to a peripheral storage device, said controller including a sequencer coupled between said central processor unit and said peripheral storage device for controlling the transfer of data to and from said peripheral storage device and a microprocessor coupled to said sequencer for controlling the operation of said sequencer, the method comprising:
    a. deactivating all control lines to said peripheral storage device from said controller, and
    b. sending test data from said central processor unit to said controller and then from said controller back to said central processor unit along a path which includes said sequencer,
    c. whereby said microprocessor can simulate signals, including false signals that would normally come from said peripheral storage device, and transmit said signals to said sequencer for the purpose of testing said sequencer.

8. The method of claim 7 and wherein said test data sent from said central processor unit to said controller and then back to said central processor unit comprises test write signals which are sent from said central processor unit to said sequencer, then from said sequencer to said microprocessor and then from said microprocessor to said central processor unit, said sequencer interpreting said data signals as if they were coming from said central processor unit whereby said central processor unit can examine data that would normally be supplied to said peripheral storage device.

9. The method of claim 7 and wherein said test data sent from said central processor unit to said controller and then back to said central processor unit comprise test read signals which are generated in said microprocessor and sent to the sequencer and then sent to the central processing unit can examine data simulating data that would normally be coming from said central processor unit.

10. The method of claim 9 and wherein said test read signals comprise pulse signals generated in said microprocessor simulating at least some of the signals sent from said peripheral storage device to said controller during a read operation, which signals can be examined by said central processor unit.

11. The method of claim 10 and wherein said pulse signals are transferred from said microprocessor to said sequencer and then from said sequencer to said central processor unit.

12. A data processing system comprising:
  a. a central processor unit for processing data,
  b. a peripheral storage device having an input and an output for storing data, and
  c. further including a controller coupled between said central processor unit and said peripheral storage device for interfacing said central processor unit to said peripheral storage device for the purpose of allowing data to be moved between said central processor unit and said peripheral storage device, said controller comprising:
    1. a sequencer unit coupled to said central processor unit and said peripheral storage device for controlling the transfer of data to and from said central processor unit,
    2. a microcomputer unit coupled to said central processor unit and said sequencer unit for controlling the operations of said controller,
    3. gating means connected to said micro-computer unit,
    4. data transfer bus means connecting said sequencer unit to said gating means,
    5. data transfer bus means connecting said gating means to the input of said peripheral storage device, said gating means enabling or disabling the transfer of data between said sequencer unit and said peripheral storage device on signals from said microcomputer unit,
    6. multiplexer means having an output connected to said sequencer unit, an input connected to said microprocessor and an input connected to the output of said peripheral storage device for transferring data to said sequencer unit from either said microcomputer unit or said peripheral storage device,
    7. data transfer bus means connecting said sequencer unit to said microcomputer for enabling data signals sent to said sequencer unit to be transmitted to said microcomputer unit,
    8. data transfer means connecting said central processor unit to said sequencer unit for enabling data signals to be sent between said central processor unit and said sequencer unit,
    9. data transfer bus means connecting said microcomputer to said central processor unit for transmitting signals between said central processor unit and said microcomputer unit, and
    10. error detection logic in said sequencer unit for detecting errors, including sector fault errors, address header errors and read data errors, in said data processing system,
    11. whereby said central processor unit can send write signals to said peripheral storage device through said sequencer unit and receive read signals from said peripheral storage device through said multiplexer means and said sequencer unit when said gating means is enabled and whereby test write signals can be sent from said central processor unit to said sequencer and then be returned to said central processor unit through said microcomputer unit and test read signals can be generated in said microcomputer unit and sent to said central processor unit through said multiplexer means and said sequencer unit when said peripheral storage device is disabled from said sequencer unit.

13. The data processing system in accordance with claim 12 and wherein said peripheral storage device is a disk drive system.

14. The data processing system in accordance with claim 13 and wherein said gating means comprises an AND gate.

15. The data processing system in accordance with claim 12 and wherein said sequencer unit comprises a sequencer, data serialization and deserialization logic circuitry and error detection logic circuitry.

16. The data processing system in accordance with claim 12 and wherein said microcomputer unit comprises a microprocessor connected to logic circuitry of said unit for interfacing said unit to said central processor unit.

17. The data processing system in accordance with claim 12 and wherein said data transfer means connecting said sequencer to said central processor unit includes a buffer for temporary storage of data.

* * * * *